(12) United States Patent
Wylie

(10) Patent No.: US 6,244,033 B1
(45) Date of Patent: Jun. 12, 2001

(54) PROCESS FOR GENERATING ELECTRIC POWER

(76) Inventor: Roger Wylie, 5907 Bayway Dr., Baytown, TX (US) 77520

( * ) Notice: Subject to any disclaimer, the term of this patent is extended or adjusted under 35 U.S.C. 154(b) by 0 days.

(21) Appl. No.: 09/273,049

(22) Filed: Mar. 19, 1999

(51) Int. Cl.[7] .............................. F02C 13/10; F02C 6/00
(52) U.S. Cl. ....................................... 60/39.02; 60/39.182
(58) Field of Search .......................... 60/39.182, 39.02; 122/7 R, 7 B

(56) References Cited

U.S. PATENT DOCUMENTS

| | | | |
|---|---|---|---|
| 4,272,953 | * | 6/1981 | Rice .................................. 60/39.182 |
| 5,526,386 | * | 6/1996 | Tsiklauri ............................. 376/317 |
| 5,628,183 | * | 5/1997 | Rice .................................. 60/39.182 |
| 5,727,379 | * | 3/1998 | Cohn ................................. 60/39.182 |
| 5,793,831 | * | 8/1998 | Tsiklauri ............................. 376/317 |

* cited by examiner

Primary Examiner—Timothy S. Thorpe
Assistant Examiner—Michael K. Gray
(74) Attorney, Agent, or Firm—Murray Nadler

(57) ABSTRACT

A process for a steam turbine-generator system that includes a boiler and a train of steam turbines and a gas turbine generator system. Exhaust gas from the gas turbine superheats the high pressure steam produced by the boiler in the steam generator system and reheats a steam side stream extracted at an intermediate point on the steam turbine train in the steam generator system after which the reheated steam side stream is fed back into the steam turbine train downstream of the extraction point. Further, the exhaust gas preheats a steam condensate stream formed by condensing the exhaust steam from the downstream steam outlet on the steam turbine train after which the preheated condensate is recycled back to the boiler. The gas turbine exhaust gas superheats the high pressure steam and reheats the steam side stream before it preheats the steam condensate stream. A second embodiment of the invention includes firing supplemental fossil fuel to provide additional heat to superheat the high pressure steam, and/or to reheat the intermediate pressure steam stream, and/or to preheat the steam condensate stream.

8 Claims, 3 Drawing Sheets

--Prior Art--

PROCESS FOR GENERATING ELECTRIC POWER

FIELD OF THE INVENTION

This invention relates to generation of electric power in large stationary power plants.

BACKGROUND OF THE INVENTION

Modern electric power generating stations include steam turbine power generating systems comprised of a boiler, steam turbines, and an electric generator. The boiler produces high pressure saturated steam that is usually superheated in tubes fired in the boiler. The steam turbines are connected in series trains with steam flowing from turbine to turbine. The high pressure superheated stream from the boiler is fed into the inlet of the upstream steam turbine. Steam pressure and temperature decrease as the steam moves downstream through the turbine train. The steam turbines are connected to a drive shaft that turns the electric generator producing electric power. The steam boiler is fired with a fossil fuel, e.g. natural gas, coal or lignite, or is heated by a nuclear reactor. Modern fossil fuel fired boilers typically operate at pressures between 1800 and 2400 psig and some operate above the critical pressure of water, which is 3206 psia. Nuclear powered boilers typically operate at much lower pressures, about 600 psig.

Typically, a steam side stream is extracted from one of the intermediate downstream turbines in the turbine train at a pressure and temperature significantly lower than the high pressure steam raised in the boiler. The extracted steam side stream is reheated and then fed back into the steam turbine train at a point downstream of the extraction point.

The exhaust steam from the steam turbines is condensed. The steam condensate is preheated, and then recycled to the steam boiler. Treated boiler feed water is added to the steam condensate to makeup losses. Typically, the boiler feed water stream is preheated with steam extracted from an intermediate point on the steam turbine train.

The capital cost of steam turbine generating systems per KWH generating capacity is high. But they are thermally efficient and have low fuel cost. Accordingly, steam turbine systems are cost effective when operated continuously to provide base load power.

Modern power stations also typically include gas fired turbine units that drive electric generators. Gas turbines cost less than steam turbine units per KWH of power capacity but they are less energy efficient than steam turbine units. Accordingly, gas turbine generators are best suited for intermittent operation to meet peak power duties.

Combined cycle units are an increasingly important component of modern power generating stations. Combined cycles are comprised of a gas turbine-generator unit wherein the hot exhaust gas from the turbine is fed into a boiler to raise steam. The steam powers a condensing steam turbine that drives a power. Alternatively, the steam is used for process heating.

Firing temperatures of gas turbines are being increased as turbine construction materials are improved to withstand higher operating temperatures. Increasing firing temperature increases gas turbine fuel efficiency. Accordingly, combined cycles are now competitive against steam cycles for base load power generation.

Minimizing fuel consumption is a key objective in design and operation of electric power generating stations. Reducing fuel consumption reduces fuel cost and reduces the amount of carbon dioxide and other pollutants dispersed into the atmosphere, or in the case of nuclear reactors, reduces nuclear fuel cost and nuclear wastes to be disposed. Fuel efficiency of a generating system in the power industry is commonly expressed as the heat rate for the system which in English units is defined as the BTU's (British Thermal Units) of heat from combustion of fuel required per KWH (kilowatt hour) of electricity produced. The heat rate can be expressed either at the lower heating value (LHV) which means that water vapor produced by total combustion of the fuel is not condensed or at the higher heating value (HHV) which means that the combustion water is condensed.

SUMMARY OF INVENTION

The process of the present invention includes a steam power generator system comprised of a steam boiler, steam turbines, and a generator, and a gas turbine-generator system. In the steam generator system: 1) the high pressure saturated steam stream produced by the boiler is superheated, 2) an intermediate steam side stream is extracted from the steam turbine train which is reheated and inserted back into a steam turbine at a downstream location, and 3) the steam turbine exhaust steam stream the downstream steam turbine is condensed, preheated and recycled back to the steam boiler. The gas turbine exhaust gas is utilized to:

superheat the high pressure steam stream; and/or reheat the intermediate steam side stream; and/or preheat the steam condensate stream.

The preferable embodiment of this invention from the standpoint of maximizing thermal efficiency is to use the gas turbine exhaust gas stream to heat all three streams. Processes wherein the gas turbine exhaust gas stream heats one or two of the streams are alternate but less thermally efficient embodiments of this invention.

It is also preferable in order to maximize thermal efficiency that the gas turbine exhaust gas stream first superheat the high pressure steam and/or reheat the intermediate steam stream after which it preheats the steam condensate stream.

Other embodiments of the present invention include firing supplemental fuel to increase high pressure steam superheat, and/or intermediate pressure steam reheat, and/or condensate preheat above heat duties that can be obtained using gas turbine exhaust gas as the only heat source for superheat, reheat, and preheat. A preferred mode is to fire the supplemental fuel only during periods of peak power demand to temporarily increase power output of the system.

It will become apparent from the forthcoming discussion that the power cycles of the present invention exhibit heat rates that are significantly lower than heat rates obtained using the conventional power cycles.

In the interest of clarity, pumps, heat exchangers, control valves, control systems, and auxiliary equipment items that are necessary for a practical and safe operating unit have intentionally been left out of the figures If they not required to elucidate the inventive concept. These deletions are generally understood by those skilled in the art and do not limit the scope of the invention.

Figure 2:
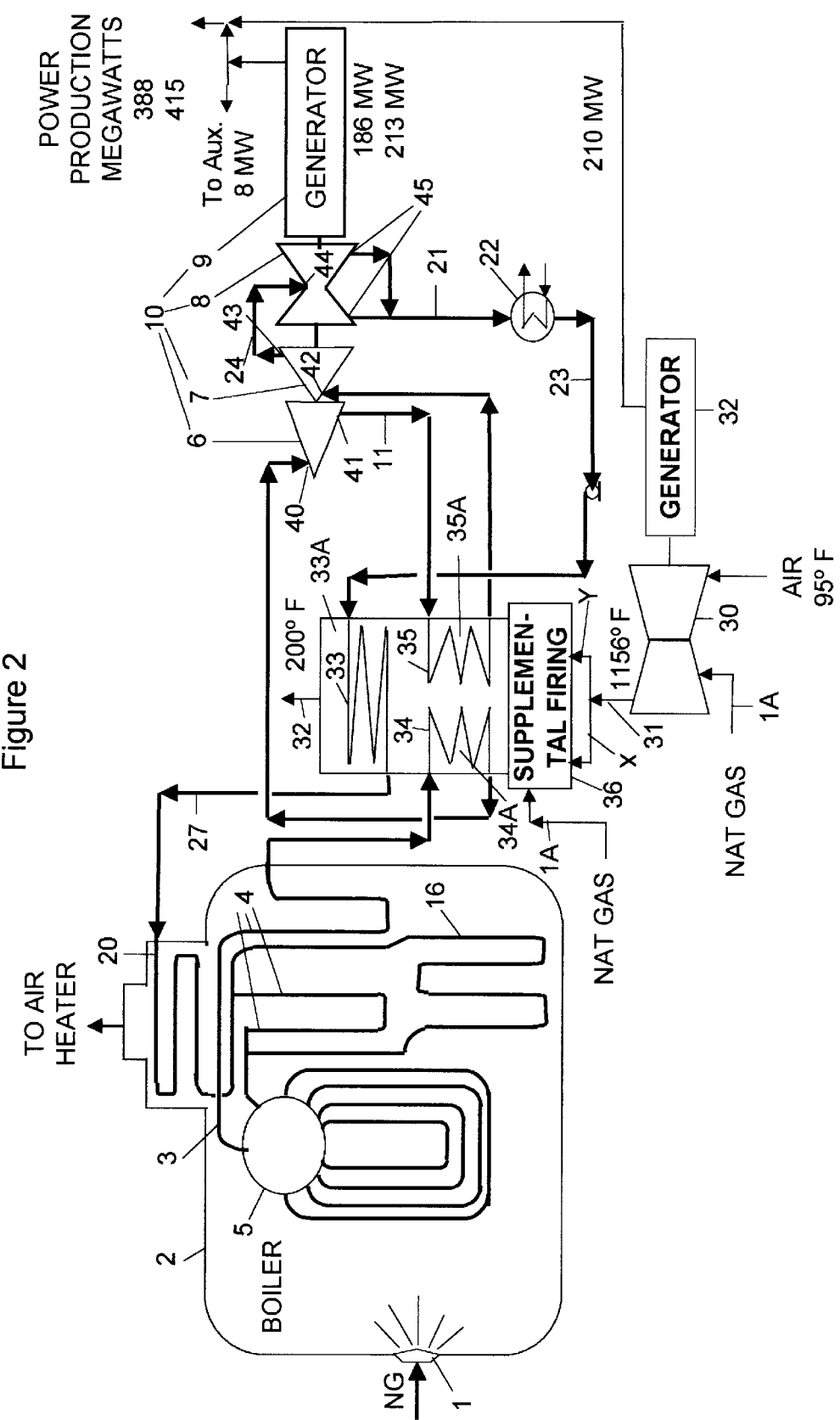
FIG. 2 is simplified flow diagram showing preferred embodiments of the process of the present.
Figure 3:
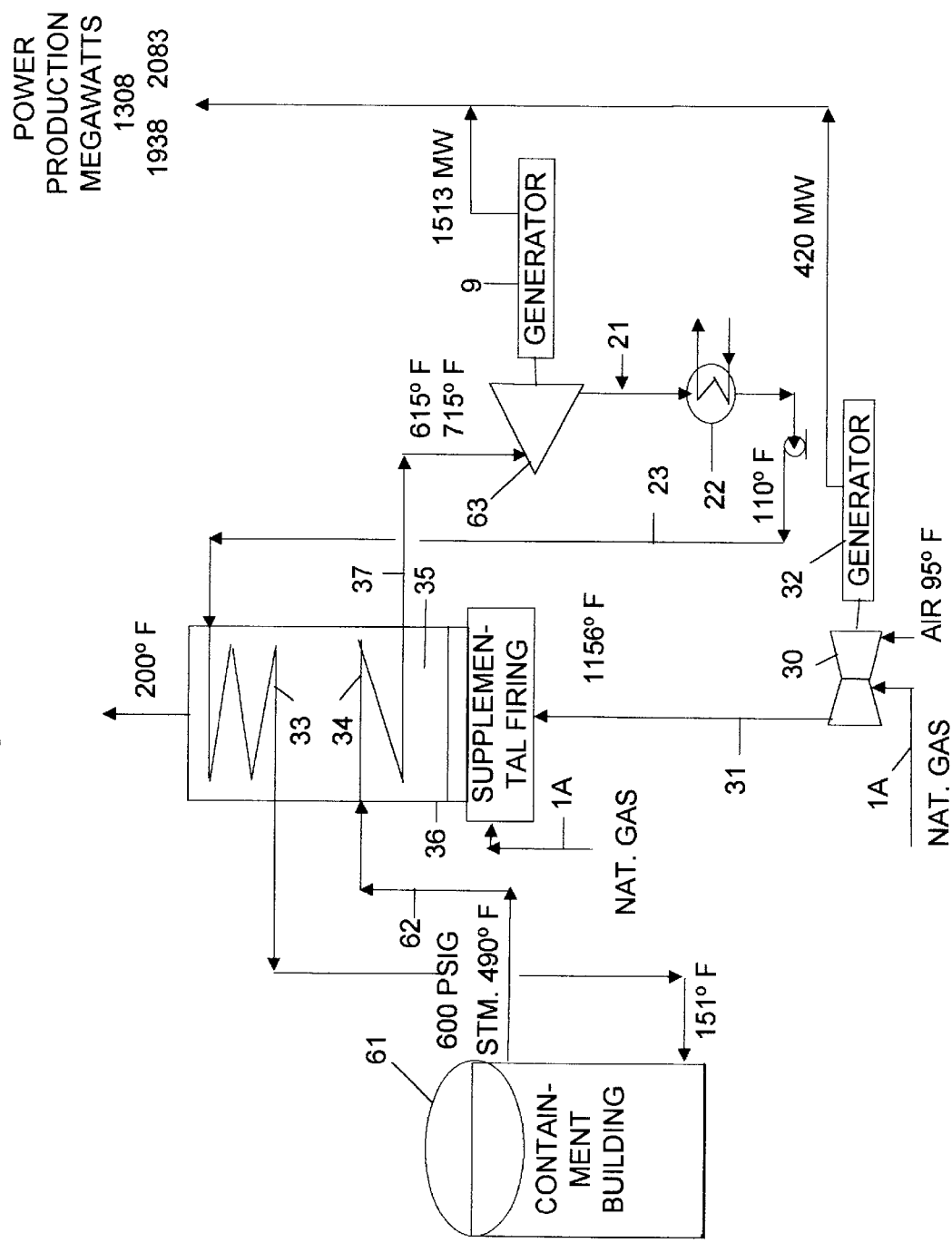
FIG. 3 is a simplified flow diagram showing a preferred embodiment of the process of the present invention using steam boilers heated with a nuclear reactor.

The FIGS. 2 and 3 show only some of the many possible embodiments of the present invention. Skilled process engineers will recognize that many other process designs can be devised using the teachings of the present invention.

The figures include pressures and temperatures at key points that support the examples in this disclosure.

DESCRIPTION OF CONVENTIONAL STEAM POWER PLANT

Figure 1:
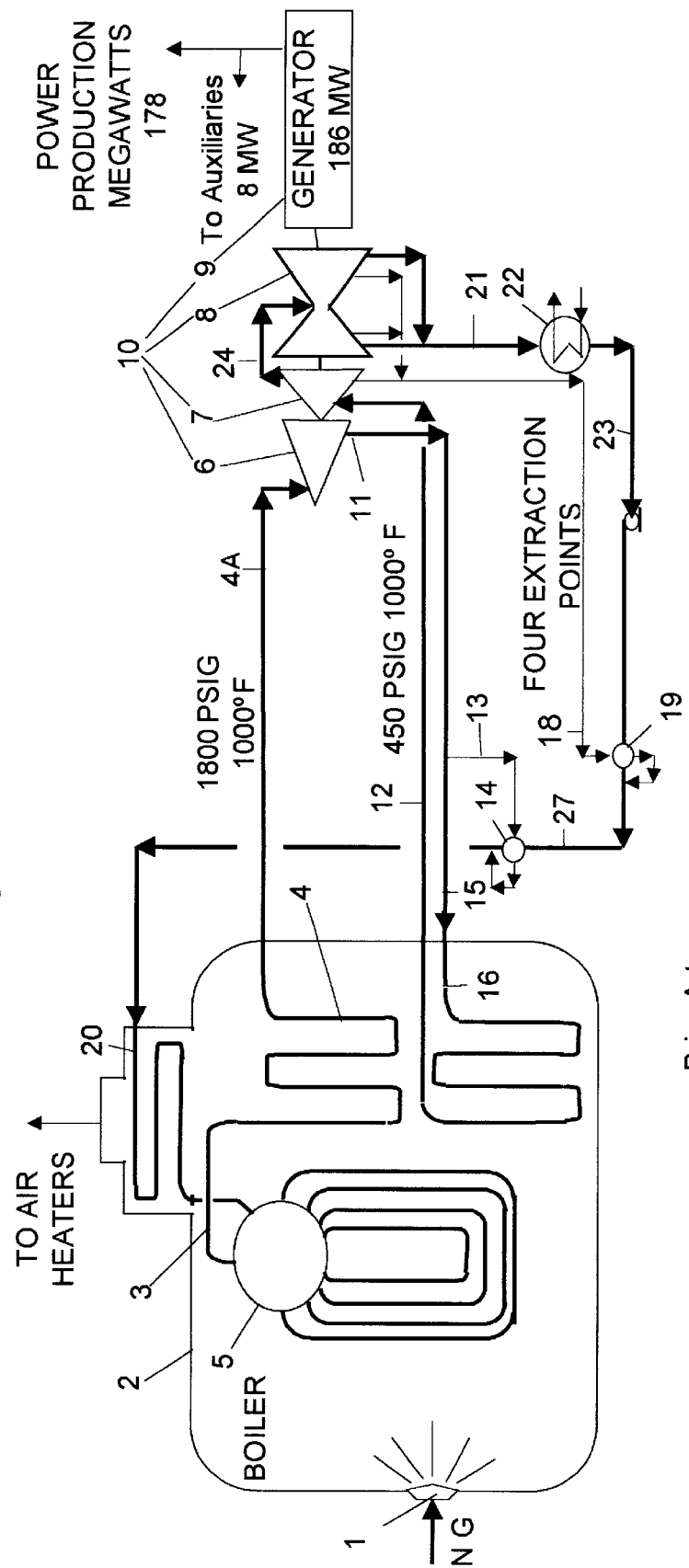
FIG. 1 is a simplified flow diagram of a conventional commercial power plant that is typical of the prior art.

FIG. 1 is a simplified flow diagram of a typical commercial steam power plant In FIG. 1 the boiler 2 is fired by burning a fossil fuel 1 e.g. natural gas, fuel oil, coal. The boiler 2 produces 1,241,000 lbs. per hour of saturated high pressure steam at 1800 psig and 622° F. in the steam drum 5. (The same 1800 psig steam stream could be raised using a suitably designed nuclear reactor, although this is not the current practice). The high pressure saturated steam stream 3 is superheated to 1000° F. in a superheater section 4 of the boiler 2.

The steam turbine train 10 includes a high pressure non-condensing turbine 6, an intermediate pressure non-condensing turbine 7, and a low pressure split flow condensing turbine 8, that are connected to a shaft that drives an electric generator 9.

The superheated high pressure steam stream 4A is fed into the inlet of the high pressure steam turbine 6. Steam flows 11 from the outlet of the high pressure turbine 6 into a 450 psig steam header 12. About 123,000 lbs. per hour of the 450 psig steam is piped 13 to the high temperature steam condensate preheater 14 to preheat the steam condensate boiler feed water stream 27 to 450° F. The remaining 1,118,000 lbs. per hour of 450 psig steam 15 is reheated to 1000° F. in the reheat section 16 of the steam boiler 2. The reheated 450 psig steam is fed into the inlet of the intermediate pressure steam turbine 7.

About 247,000 lbs. per hour of steam 18 is withdrawn from the intermediate turbine 7 at one or more points along the length of the turbine. The steam is piped to one or more low temperature steam condensate preheaters 19 where the steam condensate stream is preheated to 350° F. The steam condensate 27 is then conveyed to the high temperature steam condensate preheater 14 where the steam condensate temperature is further increased to 450° F. The boiler feed water stream is given a final temperature boost in the boiler feed water heating section 20 in the steam boiler 2.

The exhaust steam 24 from the intermediate pressure steam turbine 7 is fed into the inlet of the low pressure split flow condensing steam turbine 8. The exhaust steam from the low pressure turbine 21 is condensed in the condenser 22. The cooling medium is either cooling water or ambient air, which condense the steam to vacuum pressure. Oxygen (from ambient air) that leaks into the condensate under vacuum in the condenser is removed from the condensate by chemical adsorption techniques or in a deaerator (not shown) before the steam condensate is recycled back to the steam boiler.

Small amounts of steam condensate are injected into the high pressure steam superheat tubes and the intermediate pressure steam reheat tubes (not shown on FIG. 1) to hold fired tube wall temperatures below their design limit temperature.

Example 1

The steam turbine train-electric generator 9 produces 178 megawatts of net electric power. Assuming a typical operating parameters: boiler efficiency 96% (LHV), adiabatic steam turbine efficiency 88%, turbine/generator mechanical efficiency 98%, 4 inches of mercury pressure in the steam condenser (corresponding to summer Gulf Coast cooling water), and estimating that about eight megawatts of the gross power produced is consumed in the power station to drive the cooling water and boiler feed water pumps and the air and exhaust gas fans (not shown), the heat rate for the process of FIG. 1 is 8,884 (LHV) BTU/KWH. (Steam leaks, deaerator steam consumption, and heat losses make the actual heat rate realized slightly higher.)

DESCRIPTION OF A PREFERRED EMBODIMENT

The process of FIG. 2 includes an 1800 psig steam boiler 2 and a steam turbine generator system 10 similar to the steam turbine system of FIG. 1. The steam turbine train-generator unit 9 produces 186 MW of electric power.

The process of FIG. 2 also includes a gas turbine 30 driving an electric generator unit 32 that produces 210 MW if electric power.

The process of FIG. 2 also includes a furnace 36. The furnace 36 contains the superheat zone 34A where the high pressure steam stream 3 is superheated in superheat tubes 34. The furnace also contains the reheat zone 35A where the steam side stream 11, extracted at an intermediate pressure from the steam turbine train is reheated in the reheat tubes 35. The furnace also contains the preheat zone 33A where the steam condensate 23 is preheated in preheat tubes 33.

The gas turbine exhaust gas stream 31 is the heat source for superheating the saturated high pressure steam stream 3, reheating the intermediate pressure steam side stream 11, and preheating the condensate stream 23.

The saturated 1800 psig steam stream 3 from the boiler 2 is superheated to 100° F. in super heat exchange tubes 34 in the furnace 36, and then the superheated steam stream is fed into the inlet 40 of the high pressure steam turbine 6.

A steam side stream is extracted from the high pressure turbine 6 at 450 psig. The steam side stream 11 is piped to the reheat exchanger tubes 35 in the furnace reheat zone 35A where the steam side stream is reheated to 1000° F. and then fed into the inlet 42 of the intermediate pressure turbine 7.

Steam from the outlet 43 of the intermediate steam turbine 7 is fed to the inlet 44 of the low pressure turbine 8.

The exhaust steam 21 is removed from the low pressure turbine 44 via nozzles 45 and condensed in the condenser 22 to produce the steam condensate stream 23. The steam condensate stream 23 is pumped through preheater heat exchange tubes in the furnace 36 where it is preheated to 548° F. and then fed to the boiler 2.

The gas turbine 30 is a standard natural gas fired commercial turbine such as the Westinghouse 501 G gas turbine. It drives a generator that produces 210 MW of electric power at 95° F. ambient air temperature.

The gas turbine exhaust gas stream 31, which exits the gas turbine 30 at 1156° F., is conveyed to the furnace 36. The heat exchange tubes 33, 34, and 35 in the furnace 36 are arranged so that the gas turbine exhaust gas stream 31 flows first over the high pressure superheat tubes 34 and the steam side stream reheat tubes 35. Thus the turbine exhaust stream 31 gives up heat at high temperatures to superheat the saturated high pressure steam stream 3 and reheat the steam side stream 11.

After the turbine exhaust gas stream 31 superheats the saturated high pressure steam stream and reheats the steam side stream it flows over the condensate preheat tubes in the preheat zone 33 of the furnace 36 giving up heat at lower temperatures to preheat the steam condensate stream 23. Since the temperatures of the superheated high pressure steam and the reheated steam side stream are higher than the temperature of the preheated condensate, operating in this manner increases the thermal efficiency of the process. After preheating the steam condensate stream 23, the lo turbine exhaust gas stream 32 emerges from the furnace 36 at 200° F. The system components are specified so that the heat content of the gas turbine exhaust stream 31 from the Westinghouse 501 G gas turbine 30 is sufficient to superheat the 1,083,000 lbs. per hour of saturated steam 3 produced by the boiler 2 to 1000° F. and reheat the steam side stream 11 to 1000° F. After superheating the saturated high pressure steam stream and reheating the steam side stream, the gas turbine exhaust gas stream then still has sufficient residual heat to preheat the steam condensate stream 23 to 548° F.

Example 2

Assuming the same efficiency parameters and auxiliary power demands as in the conventional prior art power system of Example 1, the combined net power output of the steam turbine unit plus the gas turbine unit of the present invention as shown in FIG. 2 is 388 MW. The overall heat rate is 6,714 BTU (LHV)/KWH; this is 24% lower than the heat rate for the conventional prior art power system of Example 1.

EMBODIMENT USING SUPPLEMENTAL FOSSIL FUEL FIRING

Example 3

Referring again to FIG. 2, during periods of peak power demand, supplemental natural gas 1A is fired in the furnace zone 36. The supplemental firing permits the operator to increase the high pressure steam rate produced by the boiler 2 to 1,241,000 lbs. per hour, and the power output of steam turbine generator 9 using the additional steam increases the power output to 418 KWH, providing an additional 27 KWH of power. The heat rate of this additional power is 8,600 BTU (LHV)/KWH. This Is too high to be economical for continuous base load power but is cost effective during periods of peak power demand. Accordingly, supplemental firing is used to provide peak power during periods of high power demand.

DESCRIPTION OF PREFERRED EMBODIMENT FOR BOILERS HEATED BY NUCLEAR REACTORS

FIG. 3 is an embodiment of the process of the present invention that is preferred for boilers heated by nuclear reactors. Nuclear boilers operate at lower pressure e.g. about 600 psig. The process includes a nuclear reactor containment building 61 containing the nuclear reactor and steam boiler.

The nuclear boiler in the containment building 61 produces 14 million lbs per hour of a saturated steam stream 62 that is superheated to 615° F. 37 in superheat tubes 34, in furnace zone 35. The superheated steam 37 is fed into the inlet of the steam turbine 63. The steam turbine drives a generator 9 that produces 1513 MW of electric power. The exhaust steam stream 21 from the steam turbine 63 is condensed in the condenser 22, then pumped through preheat tubes 33 in the furnace 36 to preheat the condensate to 151° F., and then is recycled back to the containment building 61.

The process also includes two natural gas fired Westinghouse 501 gas turbines 30 that drive generators 32 producing 210 MW of electric power from each generator. The exhaust gas stream 31 from the gas turbine 30 is conveyed to the furnace 36 where it superheats the high pressure steam stream 62, and preheats the steam condensate stream 23.

The furnace 36 is arranged so that the gas turbine exhaust gas stream 31 flows first over the high pressure steam superheat tubes 34 giving up heat to the superheat the high pressure steam 62 at high temperatures, and then over the steam condensate preheat tubes 33 giving up more heat at lower temperatures. This cascade heat transfer arrangement increases fuel efficiency of the system because the superheating occurs at higher temperatures than the preheating.

Example 4

The total power output from the steam turbine 6 and the two gas turbines 30 is 1,933 MW. The overall heat rate for the 625 MW of incremental power produced by burning natural gas is 6,200 BTU (LHV)/KWH. In a conventional process, without the gas turbines 11, the 14 million lbs per hour of 600 psig saturated steam produced by the nuclear boiler generates only 1308 MW of power in the steam turbine-generator, providing a heat rate about 12,000 BTU (LHV)/KWH Example 5

When supplemental fossil fuel is fired in the furnace zone 35, the high pressure steam stream 62 is superheated 37 to 750° F. This increases the total power output of the plant to 2,083 MW providing 7600 BTU (LHV)/KWH heat rate.

What is claimed is:

1. A process for generating electric power comprising the steps of:

a) feeding a preheated steam condensate stream to a steam boiler wherein the preheated steam condensate stream is converted to a high pressure steam stream;

b) conveying the high pressure steam stream through high pressure steam superheat heat exchange tubes that are inserted in a high pressure steam superheat zone wherein heat is transferred into the high pressure steam superheat heat exchange tubes from a high pressure steam superheat gas stream flowing over the high pressure steam heat exchange tubes to superheat the high pressure steam stream to form a high pressure superheated steam stream;

c) feeding the superheated high pressure steam stream into the high pressure steam inlet of a steam turbine train comprised of steam turbines connected so that the superheated high pressure steam stream flows through the turbines in series downstream decreasing in pressure and temperature, and the steam turbines include a steam side stream outlet located downstream of the high pressure superheated steam inlet, a reheated steam side stream inlet located downstream of the steam side stream outlet, and an exhaust steam outlet located downstream of the steam side stream steam inlet, and the steam turbines are connected to an electric generator to drive the electric generator to produce electric power;

d) withdrawing steam at the steam side stream outlet to form a steam side stream, and reheating the steam side stream by passing the steam side stream through steam side stream reheat heat exchange tubes that are inserted in a steam side stream reheat zone wherein the steam side stream reheat heat exchange tubes are heated by a steam side stream reheat gas stream flowing over the steam side stream reheat tubes to reheat the steam side stream, and conveying the reheated steam side stream into the steam turbine train via the reheated steam side stream steam inlet;

e) withdrawing an exhaust steam stream from the exhaust steam outlet of the steam turbine train to form an exhaust steam stream, and condensing the exhaust steam stream to produce a steam condensate stream, and conveying the steam condensate stream through steam condensate preheat heat exchanger tubes that are inserted in a steam condensate reheat zone, wherein the tubes are heated by a condensate preheat gas stream flowing over the condensate preheat tubes to preheat the steam condensate stream to produce the preheated steam condensate stream of step (a);

f) feeding a stream of a fuel gas into a gas turbine wherein the fuel gas is fired and flows through the gas turbine and exits the gas turbine as a gas turbine exhaust gas stream, and the gas turbine is connected to an electric generator to drive the electric generator to produce electric power;

g) dividing the gas turbine exhaust gas stream into two gas streams;

h) conveying one of the two gas turbine exhaust gas streams from step (g) to the high pressure steam superheat heating zone of step (b) as the high pressure superheat gas stream, wherein the superheat gas stream drops in temperature as it flows over the superheat heat exchanger tubes to provide heat to superheat the high pressure steam stream, and then the high pressure superheat gas stream exits the high pressure steam superheater heating zone as the high pressure steam superheat zone exit gas stream;

i) conveying the other gas turbine exhaust stream from step (h) to the steam side stream reheat heat zone of step (d) as the steam side stream reheat gas stream wherein the steam side stream reheat gas stream drops in temperature as it flows over the steam side stream reheat heat exchange tubes to provide the heat to reheat the steam side stream and then exits the steam side stream reheat zone as the steam side stream reheat zone exit gas stream; and j) combining the high pressure super heat zone exit gas stream and the steam side stream reheat zone exit gas stream to form the steam condensate preheat gas stream of step (e), and conveying the steam condensate preheat gas stream to the steam condensate preheat zone of step (e) wherein the steam preheat gas stream drops in temperature as it flows over the steam condensate preheat heat exchanger tubes to provide heat to preheat the steam condensate and then exits the steam condensate preheat zone.

2. A process for generating electric power comprising the steps of:

a) feeding a preheated steam condensate stream to a steam boiler wherein the preheated steam condensate stream is converted to a high pressure steam stream;

b) conveying the high pressure steam stream through high pressure steam superheat heat exchange tubes that are inserted in a furnace zone wherein heat is transferred into the superheat heat exchange tubes from a hot gas stream flowing over the heat exchange tubes to superheat the high pressure steam stream to form a superheated high pressure steam stream;

c) feeding the superheated high pressure steam stream into a high pressure steam inlet of a steam turbine train comprised of steam turbines connected so that the high pressure superheated steam stream flows downstream through the steam turbines in series expanding and decreasing in pressure and temperature, and the steam turbines include a steam side stream outlet located downstream of the high pressure steam inlet, a reheated steam side stream inlet located downstream of the steam side stream steam outlet, and an exhaust steam outlet located downstream of the steam side stream steam inlet, and the steam turbine is connected to an electric generator to drive the electric generator to produce electric power;

d) withdrawing steam from the steam turbines via the steam side stream steam outlet to form a steam side stream, and reheating the steam side stream to form a reheated steam side stream by conveying the steam side stream through steam side stream reheat heat exchange tubes that are inserted in the furnace zone in close proximity to the superheat tubes of step (b) such that the hot gas stream in step (b) flows over the steam side stream heat exchange tubes to reheat the steam side, and conveying the reheated steam side stream into the steam turbine via the steam side stream inlet;

e) withdrawing steam from the steam turbines via the exhaust steam outlet of the steam turbine to form an exhaust steam stream, and condensing the exhaust steam stream to produce a steam condensate stream, and conveying the steam condensate stream through steam condensate preheat heat exchanger tubes that are inserted in the furnace zone wherein the steam condensate preheat heat exchanger tubes are heated by a steam condensate preheat gas stream flowing over them to preheat the steam condensate stream to produce the preheated steam condensate stream of step (a); and f) feeding a stream of a fuel gas into a gas turbine wherein the fuel gas is fired and flows through the gas turbine and exits the gas turbine as a gas turbine exhaust gas stream, and the gas turbine is connected to an electric generator to drive the electric generator to produce electric power, and the gas turbine exhaust gas stream is conveyed to the furnace zone as the hot gas stream specified in steps (b) and (d), and the high pressure superheat heat exchange tubes and the steam side stream reheat heat exchange tubes, and the steam condensate preheat heat exchange tubes are arranged in the furnace zone so that the hot gas stream flows first over the high pressure steam superheat heat exchange tubes and the steam side stream reheat heat exchange tubes to form the steam condensate preheat gas stream in step (e) that flows over the steam condensate preheat heat exchange tubes in step (e).

3. The process of claim 1 comprising the additional step of firing a fossil fuel in the high pressure steam superheat zone.

4. The process of claim 1 comprising the additional step of firing a fossil fuel in the steam side stream reheat zone.

5. The process of claim 1 comprising the additional step of firing a fossil fuel in the condensate preheat zone.

6. The process of claim 2 comprising the additional step of firing a fossil fuel in the furnace zone.

7. The process of claim 1 wherein the steam turbine train consists of one steam turbine.

8. The process of claim 2 wherein the steam turbine train consists of one steam turbine.

\* \* \* \* \*